United States Patent
In't Zandt et al.

(10) Patent No.: US 11,262,325 B2
(45) Date of Patent: Mar. 1, 2022

(54) SENSOR SEMICONDUCTOR DEVICE (71) Applicant: Sciosense B.V., AE Eindhoven (NL)

(72) Inventors: Micha In't Zandt, Rapperswil (CH); Frederik Willem Maurits Vanhelmont, Rapperswil (CH); Nebojsa Nenadovic, Rapperswil (CH); Dimitri Soccol, Rapperswil (CH)

(73) Assignee: SCIOSENSE B.V., AE Eindhoven (NL)

( * ) Notice: Subject to any disclaimer, the term of this patent is extended or adjusted under 35 U.S.C. 154(b) by 105 days.

(21) Appl. No.: 16/611,805

(22) PCT Filed: May 4, 2018

(86) PCT No.: PCT/EP2018/061525
§ 371 (c)(1),
(2) Date: Nov. 7, 2019

(87) PCT Pub. No.: WO2018/206432
PCT Pub. Date: Nov. 15, 2018

(65) Prior Publication Data
US 2020/0064295 A1 Feb. 27, 2020

(30) Foreign Application Priority Data
May 9, 2017 (EP) .................................... 17170184

(51) Int. Cl.
*G01N 27/22* (2006.01)
(52) U.S. Cl.
CPC ................. *G01N 27/223* (2013.01)
(58) Field of Classification Search
CPC .................................................. G01N 27/223
See application file for complete search history.

(56) References Cited

U.S. PATENT DOCUMENTS 9,027,400 B2  5/2015 Le Neel et al.
9,171,810 B2  10/2015 In't Zandt et al.
(Continued)

FOREIGN PATENT DOCUMENTS

CN     1823272 A     8/2006
CN     203241373 U   10/2013
(Continued)

OTHER PUBLICATIONS

Hernández-Rivera, D.; Rodriguez-Roldán, G.; Mora-Martnez, R.; Suaste-Gómez, E. A Capacitive Humidity Sensor Based on an Electrospun PVDF/Graphene Membrane. Sensors 2017, 17, 1009. https://doi.org/10.3390/s17051009 (Year: 2017).*

(Continued)

*Primary Examiner* — Noam Reisner
(74) *Attorney, Agent, or Firm* — Slater Matsil, LLP (57) ABSTRACT

A sensor semiconductor device comprises a transducer which comprises a capacitor with at least two electrodes. The transducer further comprises a polymer which is arranged between at least two electrodes of the capacitor, and a top surface of the transducer. The polymer is able to absorb water and the top surface is arranged such that it is exposed to the environment of the sensor semiconductor device. Furthermore, at least a part of the top surface is superhydrophobic and the sensor semiconductor device is capable of measuring the humidity of the environment of the sensor semiconductor device.

21 Claims, 8 Drawing Sheets

(56) References Cited

U.S. PATENT DOCUMENTS

| | | | |
|---|---|---|---|
| 10,175,188 B2 | 1/2019 | O'Brien et al. | |
| 10,191,006 B2 | 1/2019 | Futatsugi | |
| 10,677,747 B2 | 6/2020 | Beck et al. | |
| 2007/0189931 A1 | 8/2007 | Ruhe et al. | |
| 2009/0056439 A1* | 3/2009 | Suzuki | G01N 27/223 73/335.02 |
| 2010/0055824 A1* | 3/2010 | Lin | B82Y 10/00 438/73 |
| 2011/0166045 A1* | 7/2011 | Dhawan | G01N 21/648 506/39 |
| 2012/0071734 A1* | 3/2012 | Shimuta | A61B 5/6897 600/301 |
| 2012/0241460 A1* | 9/2012 | Ibbotson | D04H 1/4291 220/571 |
| 2013/0139587 A1 | 6/2013 | Le Neel et al. | |
| 2014/0196522 A1* | 7/2014 | Borini | G01N 27/223 73/29.03 |
| 2014/0300668 A1* | 10/2014 | Chang | B41J 2/1621 347/54 |
| 2015/0153297 A1* | 6/2015 | Aliane | G01N 27/223 73/335.04 |
| 2015/0368824 A1 | 12/2015 | Lim et al. | |
| 2016/0202201 A1 | 7/2016 | Cobianu et al. | |
| 2017/0082567 A1 | 3/2017 | O'Brien et al. | |

FOREIGN PATENT DOCUMENTS

| | | | |
|---|---|---|---|
| CN | 104914139 | | 9/2015 |
| CN | 205944090 U | | 2/2017 |
| EP | 1369683 A1 | | 12/2003 |
| EP | 3168866 | | 5/2017 |
| EP | 3168866 A1 * | 5/2017 | ......... H01L 23/3107 |
| EP | 3401674 A1 | | 11/2018 |
| JP | 2003-262600 | | 9/2003 |
| JP | 2012-068054 | | 4/2012 |
| JP | 2015-161600 | | 9/2015 |
| TW | 200741200 | | 11/2007 |
| TW | 200819739 | | 5/2008 |
| TW | 201506392 A | | 2/2015 |
| TW | 201617585 A | | 5/2016 |
| TW | 201704745 A | | 2/2017 |
| TW | 201710675 A | | 3/2017 |
| WO | 2016/056887 | | 4/2016 |
| WO | 2016134079 A1 | | 8/2016 |
| WO | 2018/062379 | | 4/2018 |

OTHER PUBLICATIONS

Moradi et al. (Moradi, R.; Karimi-Sabet, J.; Shariaty-Niassar, M.; Koochaki, M.A. Preparation and Characterization of Polyvinylidene Fluoride/Graphene Superhydrophobic Fibrous Films. Polymers 2015, 7, 1444-1463. https://doi.org/10.3390/polym7081444). (Year: 2015).*

Callies, M. et al. :"On water repellency" Soft Matter, vol. 1, No. 1, 22. Apr. 2005 (Apr. 22, 2005).

D'Urso et al. "Emergence of superhydrophobic behavior on vertically aligned nanocone arrays", Appl. Phys. Lett. 90 (2007) 044102.

European Patent Office, International for PCT/EP2018/061525 dated Jul. 4, 2018.

Extrand, C.W.: "Model for contact angles and Hysteresis on Rough and Ultraphobic surfaces" Langmuir 2002, 18, 7991-7999.

Gu et al. "Superhydrophobic polyimide films with high thermal endurance via UV photo-oxidation", eXPRESS Polymeter letters (2014) vol. 8, No. 8:588-595.

Krupenkin et al. "Electrically Tunable Superhydrophobic Nanostructured Surfaces", Bell Labs Tech. J. 10 (2005) 161-170.

Simpson et al, "Superhydrophobic materials and coatings: a review", Rep. Prog. Phys. 78.

Wenzel, R. N.: "Resistance of Solid Surfaces to Wetting" Ind. Eng. Chem. 1936 28(8), pp. 988-994.

Zhang, X. et al.: "Superhydrophobic surfaces: from structural control to functional application" Journal of materials chemistry, vol. 18, No. 6, 14. Nov. 2007, pp. 621-663.

Zhao et al.: "Superhydrophobic modification of poly imide films based on gold-coated porous silver nanostructures and self-assembled monolayers", J Mater Chem (2006) 10,4504-4509.

Shen Q., "Molecular Acid-Base Chemistry," Shanghai Scientific and Technological Literature Press, Mar. 31, 2012, 11 pages.

* cited by examiner

SENSOR SEMICONDUCTOR DEVICE

CROSS-REFERENCE TO RELATED APPLICATIONS

The present application is the national stage entry of International Patent Application No. PCT/EP2018/061525, filed on May 4, 2018, which claims the benefit of priority of European Patent Application No. 17170184.0, filed on May 9, 2017, all of which are hereby incorporated by reference in their entirety for all purposes.

BACKGROUND OF THE INVENTION

The present application relates to a sensor semiconductor device and to a method of producing a sensor semiconductor device.

Sensor semiconductor devices can be employed to measure different parameters as for example the relative humidity or the temperature. For measuring the relative humidity a polymer which can absorb moisture out of the air can be employed. Under high humidity conditions water can condense on the top surface of the polymer or on the top of the sensor semiconductor device. In this case the polymer requires time for recovering from the high humidity conditions. This means, the water needs to diffuse out of the polymer and the condensed water droplets need to evaporate from the sensor semiconductor device. This process can require a certain time in which the sensor semiconductor device does not correctly measure the relative humidity of the environment. Furthermore, the surface of the polymer or of the sensor semiconductor device can get contaminated with dirt or dust particles which can be dissolved in or collected by water droplets. Also in this way the accuracy of the sensor semiconductor device can be negatively influenced.

SUMMARY OF THE INVENTION

In one embodiment of the sensor semiconductor device the sensor semiconductor device comprises a transducer which comprises a capacitor with at least two electrodes. The transducer can be capable of measuring the relative humidity in the environment of the sensor semiconductor device. The capacitor can be for example a parallel plate capacitor or a fringe capacitor. The at least two electrodes comprise an electrically conductive material.

The transducer further comprises a polymer which is arranged between at least two electrodes of the capacitor and the transducer further comprises a top surface of the transducer. The polymer is able to absorb water and the top surface is arranged such that it is exposed to the environment of the sensor semiconductor device. The polymer can reversibly collect or absorb water from the air in the environment of the sensor semiconductor device and the dielectric constant of the polymer depends on the amount of collected water or moisture. This means, the dielectric constant of the polymer is a measure for the relative humidity in the environment of the sensor semiconductor device. As the polymer is arranged between at least two electrodes of the capacitor, the capacitance of the capacitor depends on the dielectric constant of the polymer. Therefore, also the capacitance depends on the amount of water collected by the polymer and thus on the relative humidity in the environment of the sensor semiconductor device. By measuring the capacitance of the capacitor the sensor semiconductor device can be employed as a relative humidity sensor.

The thickness of the electrodes of the capacitor is optionally between a few nanometers and a few micrometers. The thickness of the polymer between the two electrodes of the capacitor is optionally at least 1 µm and at most 10 µm.

The top surface of the transducer can also be a top surface of the sensor semiconductor device. The top surface extends in lateral directions which are parallel to the main plane of extension of the sensor semiconductor device. If the capacitor is a parallel plate capacitor the top surface can be comprised by one of the electrodes of the capacitor. It is also possible that a top layer is arranged on one of the electrodes and that the top layer comprises the top surface. The top surface is arranged at the side of the top layer or of the electrode which faces away from the polymer. If the capacitor is a fringe capacitor the top surface can be comprised by the polymer which can be arranged between and on top of the electrodes of the capacitor. It is also possible that the top layer is arranged on top of the polymer and that the top layer comprises the top surface. The top surface is arranged at the side of the top layer or of the polymer which faces away from the electrodes of the capacitor.

At least a part of the top surface is superhydrophobic. This means at least a part of the top surface repels water. The top surface can be modified to be superhydrophobic. Therefore the top surface can be roughened or structured and the surface area is increased. The top surface can be structured by different methods. For example, the top surface can be structured by at least one of patterning, roughening, structuring by photolithography, chemical treatment, etching, ultra-violet light exposure, growth of nanostructured metal layers.

The top surface can for example be patterned by etching. Therefore a masking layer is deposited on the top surface. The masking layer can be a photoresist layer or a hard mask layer which comprises for example silicon oxide, a nitride or a metal. The masking layer is patterned by lithographic methods such that the masking layer is removed from the top surface in places. The masking layer can be regularly patterned which is easier to produce or it is also possible that it is randomly patterned. In a next step the material below the masking layer is etched in the areas where the masking layer is removed from the top surface by wet chemical etching or by reactive ion etching. In this way, structures are formed on the top surface. The material below the masking layer can be an electrode of the capacitor, the polymer or the top layer. Optionally, the masking layer is underetched. As a final step the masking layer can be removed. It is also possible that the masking layer remains on the top surface for example if it is a hard mask.

In another embodiment a thin sputtered metal layer is deposited as the masking layer. If the metal layer is thin enough it will form islands of metal rather than a closed layer. The islands of metal then can act as the structures as described above. However, in this way the structures are arranged in a random pattern.

In another embodiment the top surface is roughened by reactive ion etching with for example a mixture of $N_2$, $O_2$ and $CF_4$. In this case no masking layer is required.

In another embodiment the top surface is roughened by exposure to ultraviolet light. In a next step the top surface can further be treated with 1H, 1H, 2H, 2H-Perfluorodecyltriethoxysilane. The combination of both steps makes the top surface superhydrophobic.

In another embodiment a structured silver layer is created on the top surface by treating the top surface with KOH and $AgNO_3$ and an additional thermal treatment and n-dodecanethiol exposure.

The sensor semiconductor device is capable of measuring the humidity of the environment of the sensor semiconductor device. This means, for example the humidity of air in the environment of the sensor semiconductor device can be measured. For this purpose the capacitance of the capacitor is measured for example continuously or at fixed times. The capacitance relates to the relative humidity as it changes with the dielectric constant of the polymer which depends on the relative humidity. At least a part of the polymer is exposed to the air in the environment of the sensor semiconductor device such that the polymer can absorb moisture out of the air. In the case that water droplets condense on the top surface the relative humidity amounts to 100%.

By structuring the top surface the contact angle of water droplets on the top surface is increased in comparison to a surface which is not superhydrophobic. The contact angle of water droplets on the top surface is given by the angle between the main plane of extension of the top surface and a tangent at the surface of the water droplet at the position where the water droplet is in contact with the top surface. As the top surface is structured, water droplets are only in contact with parts of the top surface, for example with peaks of the structured surface. Consequently, water droplets on the top surface can easily roll off to other parts of the transducer. Preferably, only the top surface is superhydrophobic and no other parts of the transducer.

If water condenses on top of the polymer the maximum capacitance value is read which corresponds to 100% relative humidity. Advantageously, the top surface is superhydrophobic and it can be the top surface of the polymer. In this case it is hard to wet the top surface of the polymer and water droplets easily roll off from the top surface of the polymer. Therefore, the polymer does not have to recover from high humidity conditions before it can measure the relative humidity of the environment correctly again. If the water droplets stayed on the top surface of the polymer it would only measure the relative humidity correctly again after the evaporation of the water droplets. Since the top surface is at least partially superhydrophobic, water droplets are immediately repelled and a change in relative humidity can be detected by the polymer within a reasonably short recovery time.

It is also possible that the top surface gets contaminated with particles of dust or dirt. If water droplets condense on the top surface it is advantageously possible that contaminants as dust or dirt particles are mixing with or dissolving in water droplets and are thus removed from the top surface as the water droplets roll off to other parts of the transducer.

By avoiding a relatively long recovery time of the polymer after condensating conditions and by avoiding contaminants on the top surface of the transducer the accuracy of the measurement of the relative humidity is maintained or faster reached. In other words, the accuracy of the measurement of the relative humidity is increased under these circumstances.

In one embodiment of the sensor semiconductor device the transducer comprises a top layer with the top surface where the top layer is structured such that at least a part of the top surface is superhydrophobic. The top layer is the topmost layer of the transducer and it comprises the top surface at the side of the top layer which faces away from the capacitor. If the capacitor is a parallel plate capacitor the top layer can be arranged on top of an electrode of the capacitor at a side of the electrode which faces away from the polymer. If the capacitor is a fringe capacitor the top layer can be arranged on top of the polymer at a side of the polymer that faces away from the capacitor. The top layer can be structured as described above for the top surface such that at least a part of the top surface is superhydrophobic.

The top layer can be structured instead of other parts of the transducer such that at least a part of the top surface is superhydrophobic. Therefore, it is possible that the top layer comprises a material which can be easily structured in comparison to other parts of the transducer.

In one embodiment of the sensor semiconductor device the capacitor is a plate capacitor. This means, the capacitor is a parallel plate capacitor and can comprise two electrodes which are arranged in parallel to each other. For example, the electrodes can have a rectangular shape. In this case the polymer can have the shape of a cuboid which is arranged between the two electrodes.

In one embodiment of the sensor semiconductor device the capacitor is a fringe capacitor. This means, the capacitor can comprise two electrodes which have the shape of fingers, combs, meanders, spirals or combinations thereof. The polymer can be arranged between, above and/or below the electrodes. If the top surface comprises a regular pattern of structures the structures can be aligned with the underlying electrodes of the capacitor. However, it is also possible that the structures are not aligned with the underlying electrodes.

In one embodiment of the sensor semiconductor device a trench is arranged around the transducer, the trench providing drainage of a liquid from the top surface. This means, the trench is arranged at a lower position than the top surface of the transducer such that water droplets repelled by the top surface roll off towards the trench. The trench can be arranged around the transducer from all sides or it can only partially surround the transducer. Advantageously, the trench collects the liquid or the water droplets from the top surface such that no other places of the transducer or the sensor semiconductor device are wetted by the liquid or the water droplets.

In one embodiment of the sensor semiconductor device, structures are formed within the top surface by photolithography, where the size of the structures is at least 1 nm and at most 100 µm in lateral directions which are parallel to the main plane of extension of the transducer, and at least 1 nm and at most 1 µm in vertical direction, which is perpendicular to the main plane of extension of the transducer. By forming the structures within the top surface, at least a part of the top surface is made superhydrophobic.

Furthermore, a method of producing a sensor semiconductor device is provided. Preferably, the sensor semiconductor device can be produced by means of a method described herein. In other words, all features disclosed for the sensor semiconductor device are also disclosed for the method and vice versa.

According to at least one embodiment of the method of producing a sensor semiconductor device, the method comprises forming a transducer which comprises a capacitor with at least two electrodes. The transducer can be capable of measuring the relative humidity in the environment of the sensor semiconductor device. The capacitor can be for example a parallel plate capacitor or a fringe capacitor. The at least two electrodes comprise an electrically conductive material.

The method further comprises arranging a polymer between at least two electrodes of the capacitor. The polymer is able to absorb water. The polymer can reversibly collect or absorb water from the air in the environment of the sensor semiconductor device and the dielectric constant of the polymer depends on the amount of collected water or moisture. This means, the dielectric constant of the polymer is a measure for the relative humidity in the environment of the sensor semiconductor device. As the polymer is arranged between at least two electrodes of the capacitor the capacitance of the capacitor depends on the dielectric constant of the polymer. Therefore, also the capacitance depends on the amount of water collected by the polymer and thus on the relative humidity in the environment of the sensor semiconductor device. By measuring the capacitance of the capacitor the sensor semiconductor device can be employed as a relative humidity sensor.

The method further comprises structuring a top layer of the transducer such that a top surface of the top layer is at least partially superhydrophobic. The top surface is arranged such that it is exposed to the environment of the sensor semiconductor device. This means at least a part of the top surface repels water. The top surface can be modified to be superhydrophobic. Therefore the top surface can be roughened or structured and the surface area is increased. The top surface can be structured by different methods.

Moreover, the sensor semiconductor device is capable of measuring the humidity of the environment of the sensor semiconductor device. This means, for example the humidity of air in the environment of the sensor semiconductor device can be measured. For this purpose the capacitance of the capacitor is measured for example continuously or at fixed times. The capacitance relates to the relative humidity as it changes with the dielectric constant of the polymer which depends on the relative humidity. At least a part of the polymer is exposed to the air in the environment of the sensor semiconductor device such that the polymer can absorb moisture out of the air. In the case that water droplets condense on the top surface the humidity amounts to 100%.

As described above for the sensor semiconductor device the accuracy of the measurement of the relative humidity is maintained or faster recovered since the top surface is at least partially superhydrophobic. In other words, the accuracy of the measurement of the relative humidity is increased under these circumstances. In this way, a recovery time of the polymer after high humidity conditions and contaminants on the top surface of the transducer can be avoided.

According to at least one embodiment of the method the top layer is comprised by the polymer. This means, the polymer is the topmost part or layer of the transducer. The top layer is arranged at the side of the polymer which faces away from the capacitor. The polymer can be the topmost part or layer of the transducer for example if the capacitor is a fringe capacitor and the polymer is arranged between and above the electrodes of the capacitor. In this case the polymer is structured or roughened such that the top surface is at least partially superhydrophobic.

According to at least one embodiment of the method the top layer is comprised by an electrode of the capacitor. This means, the electrode is the topmost part of the transducer. If the capacitor is a plate capacitor the polymer can be arranged between the two electrodes of the capacitor such that one of the electrodes is the topmost part of the transducer. In this case the electrode is structured or roughened such that the top surface is at least partially superhydrophobic.

According to at least one embodiment of the method the top layer is comprised neither by the polymer nor by an electrode of the capacitor. The top layer can be a separate layer which is not comprised by the capacitor. The top layer can be arranged on top of the capacitor in vertical direction. It is also possible that the top layer is arranged on top of the polymer in vertical direction.

According to at least one embodiment of the method the capacitor is a plate capacitor. This means, the capacitor can comprise two electrodes which are arranged in parallel to each other. For example, the electrodes can have a rectangular shape. In this case the polymer can have the shape of a cuboid which is arranged between the two electrodes.

According to at least one embodiment of the method the capacitor is a fringe capacitor. This means, the capacitor can comprise two electrodes which have the shape of fingers, combs, meanders, spirals or combinations thereof. The polymer can be arranged between, above and/or below the electrodes. If the top surface comprises a regular pattern of structures, the structures can be aligned with the underlying electrodes of the capacitor. However, it is also possible that the structures are not aligned with the underlying electrodes.

According to at least one embodiment of the method a trench is arranged around the transducer, the trench providing drainage of a liquid from the top surface. This means, the trench is arranged at a lower position than the top surface of the transducer such that water droplets repelled by the top surface roll off towards the trench. The trench can be arranged around the transducer from all sides or it can only partially surround the transducer. Advantageously, the trench collects the liquid or the water droplets from the top surface such that no other places of the transducer or the sensor semiconductor device are wetted by the liquid or the water droplets.

According to at least one embodiment of the method the structuring of the top layer involves at least one of the following:
patterning,
roughening,
structuring by photolithography,
chemical treatment,
etching,
ultra-violet light exposure,
growth of nanostructured metal layers.

The top layer can for example be patterned by etching. Therefore a masking layer is deposited on top of the top layer. The masking layer can be a photoresist layer or a hard mask layer which comprises for example silicon oxide, a nitride or a metal. The masking layer is patterned by lithographic methods such that the masking layer is removed from the top layer in places. The masking layer can be regularly patterned which is easier to produce or it is also possible that it is randomly patterned. In a next step the top layer is etched in the areas where the masking layer is removed from the top surface by wet chemical etching or by reactive ion etching. In this way, structures are formed on or within the top layer. Optionally, the masking layer is under-etched. As a final step the masking layer can be removed. It is also possible that the masking layer remains on top of the top layer for example if it is a hard mask.

In another embodiment a thin sputtered metal layer is deposited as the masking layer. If the metal layer is thin enough it will form islands of metal rather than a closed layer. The islands of metal then can act as a masking layer as described above. However, in this way the structures are arranged in a random pattern.

In another embodiment the top layer is roughened by reactive ion etching with for example a mixture of $N_2$, $O_2$ and $CF_4$. In this case no masking layer is required.

In another embodiment the top layer is roughened by exposure to ultraviolet light. In a next step the top layer can further be treated with 1H, 1H, 2H, 2H-Perfluorodecyltriethoxysilane. The combination of these steps makes the top surface superhydrophobic.

In another embodiment a structured silver layer is created on top of the top layer by treating the top surface with KOH and AgNO$_3$ and an additional thermal treatment and n-do-decanethiol exposure.

According to at least one embodiment of the method structures are formed within the top layer by photolithography, where the size of the structures is at least 1 nm and at most 100 µm in lateral directions which are parallel to the main plane of extension of the transducer. The size of the structures in vertical direction which is perpendicular to the lateral directions can be at least 1 nm and at most 1 µm. By forming the structures within the top layer, at least a part of the top surface is made superhydrophobic.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

With FIGS. 2A, 2B, 3A, 3B, 4A and 4B further exemplary embodiments of the sensor semiconductor device are shown.

With FIG. 6A a method for forming an exemplary embodiment of the sensor semiconductor device is described.

DETAILED DESCRIPTION

Figure 1A:
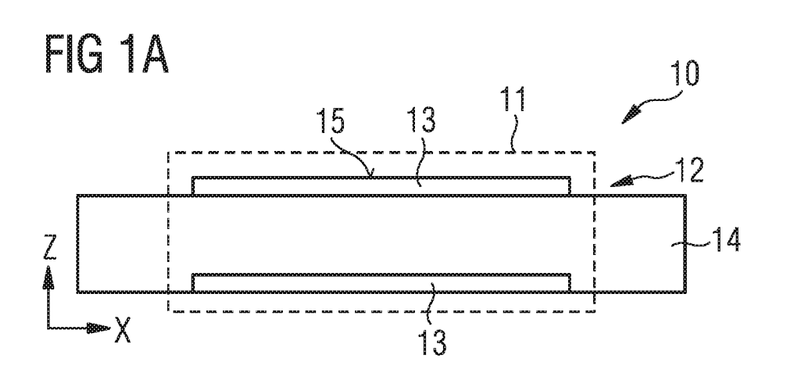
FIG. 1A shows a cutaway view of an exemplary embodiment of a sensor semiconductor device.

In FIG. 1A a cutaway view of an exemplary embodiment of a sensor semiconductor device 10 is shown. The sensor semiconductor device 10 comprises a transducer 11 which comprises a capacitor 12. In this embodiment the capacitor 12 is a parallel plate capacitor. The capacitor 12 comprises two electrodes 13 which are arranged at a distance from each other. The two electrodes 13 are arranged parallel to each other and they are arranged on top of each other in vertical direction z which is perpendicular to the main plane of extension of the transducer 11. A polymer 14 is arranged between the two electrodes 13. The polymer 14 has a larger extent in a lateral direction x than the two electrodes 13. The lateral direction x is perpendicular to the vertical direction z. The dashed line marks the extent of the transducer 11.

The polymer 14 is able to absorb water. The polymer 14 can reversibly collect or absorb water from the air in the environment of the sensor semiconductor device 10 and the dielectric constant of the polymer 14 depends on the amount of collected water or moisture.

The transducer 11 further comprises a top surface 15. In this embodiment the top surface 15 is comprised by the upper electrode 13. The top surface 15 is arranged such that it is exposed to the environment of the sensor semiconductor device 10 and at least a part of the top surface 15 is superhydrophobic.

Figure 1B:
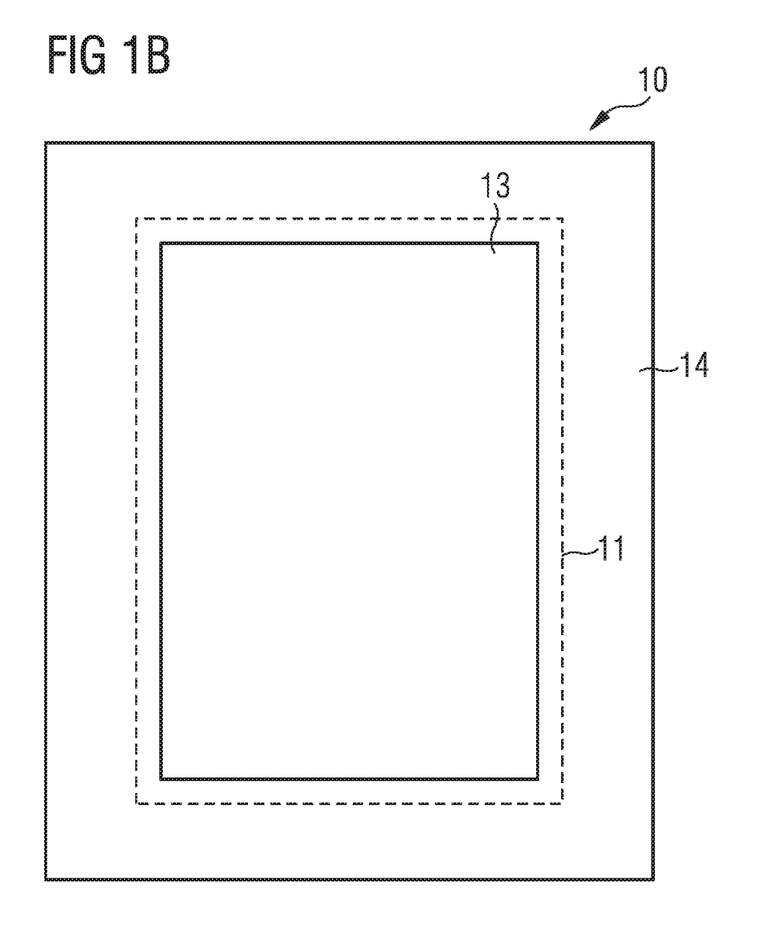
FIG. 1B shows a top view of the exemplary embodiment of the sensor semiconductor device of FIG. 1A.

FIG. 1B shows a top view of the exemplary embodiment of the sensor semiconductor device 10 of FIG. 1A. The upper electrode 13 is shown from the top and the polymer 14 has a larger lateral extent than the electrodes 13 of the capacitor 12.

Figure 2A:
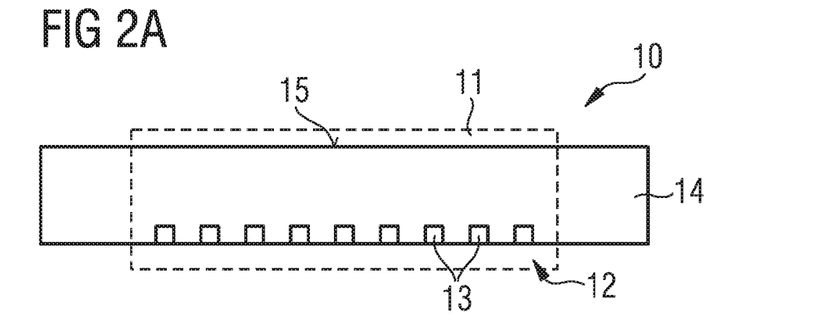

In FIG. 2A a cutaway view of a further exemplary embodiment of the sensor semiconductor device 10 is shown. In this embodiment the capacitor 12 is a fringe capacitor. This means, the two electrodes 13 of the capacitor 12 are arranged as combs. The polymer 14 is arranged between and above the electrodes 13 of the capacitor 12. The dashed line again marks the extent of the transducer 11.

Figure 2B:
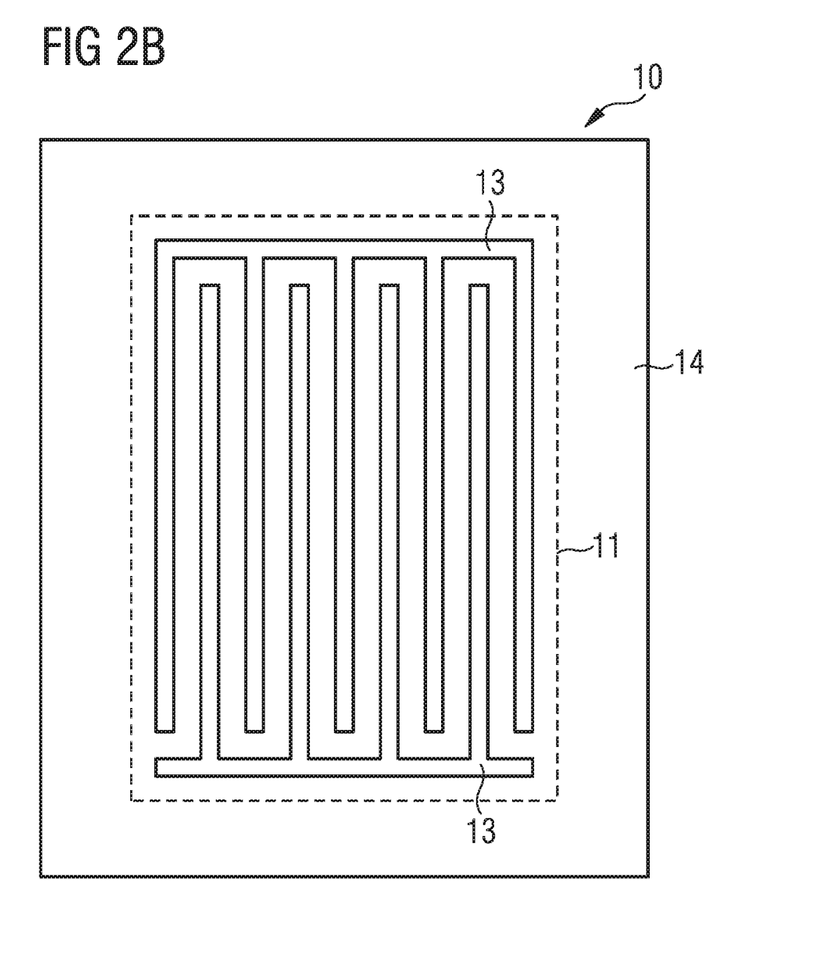

FIG. 2B shows a top view of the exemplary embodiment of the sensor semiconductor device 10 of FIG. 2A. The two electrodes 13 are arranged as combs and the polymer 14 is arranged between and above the two electrodes 13.

Figure 3A:
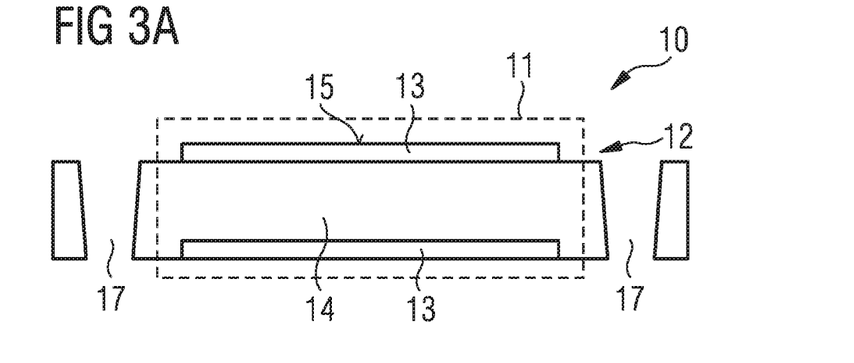

In FIG. 3A a cutaway view of a further exemplary embodiment of the sensor semiconductor device 10 is shown. The capacitor 12 is a parallel plate capacitor. In addition to the embodiment shown in FIG. 1A the sensor semiconductor device 10 further comprises a trench 17 which is arranged around the transducer 11 and it provides drainage of a liquid from the top surface 15. The trench 17 is arranged within the polymer 14 and it optionally completely surrounds the transducer 11. This means, the trench 17 is arranged at a lower vertical position than the top surface 15 such that water droplets repelled by the top surface 15 roll off towards the trench 17. Advantageously, the trench 17 collects the liquid or the water droplets from the top surface 15 such that no other places of the transducer 11 or the sensor semiconductor device 10 are wetted by the liquid or the water droplets.

Figure 3B:
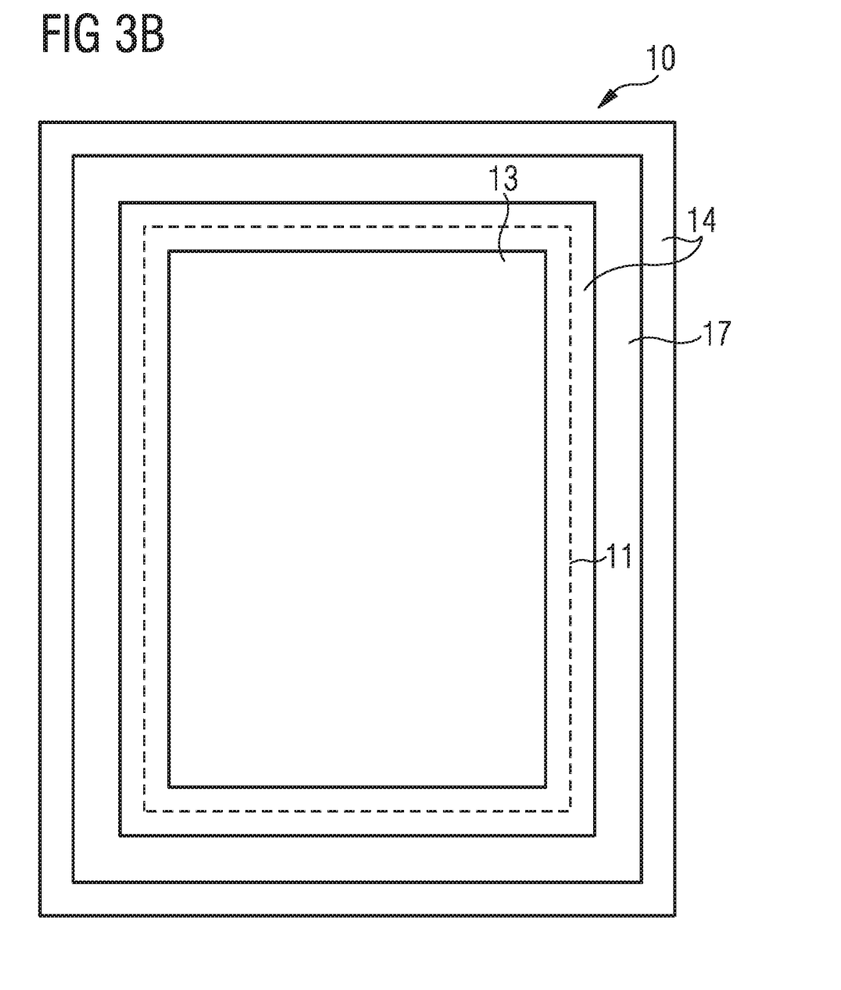

FIG. 3B shows a top view of the exemplary embodiment of the sensor semiconductor device 10 of FIG. 3A. The trench 17 surrounds the transducer 11 at all lateral sides.

Figure 4A:
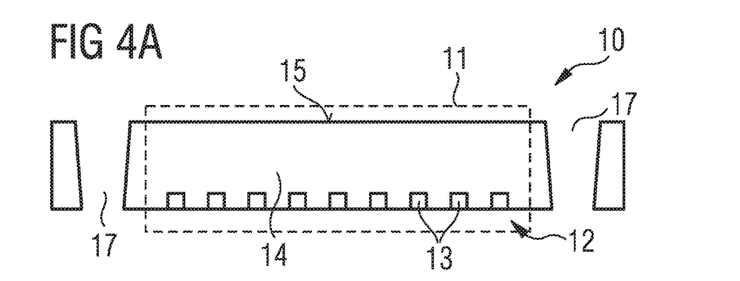

In FIG. 4A a cutaway view of a further exemplary embodiment of the sensor semiconductor device 10 is shown. The capacitor 12 is a fringe capacitor. In addition to the embodiment shown in FIG. 2A the sensor semiconductor device 10 further comprises a trench 17 which is arranged around the transducer 11 and it provides drainage of a liquid from the top surface 15. The top surface 15 is comprised by the polymer 14.

Figure 4B:
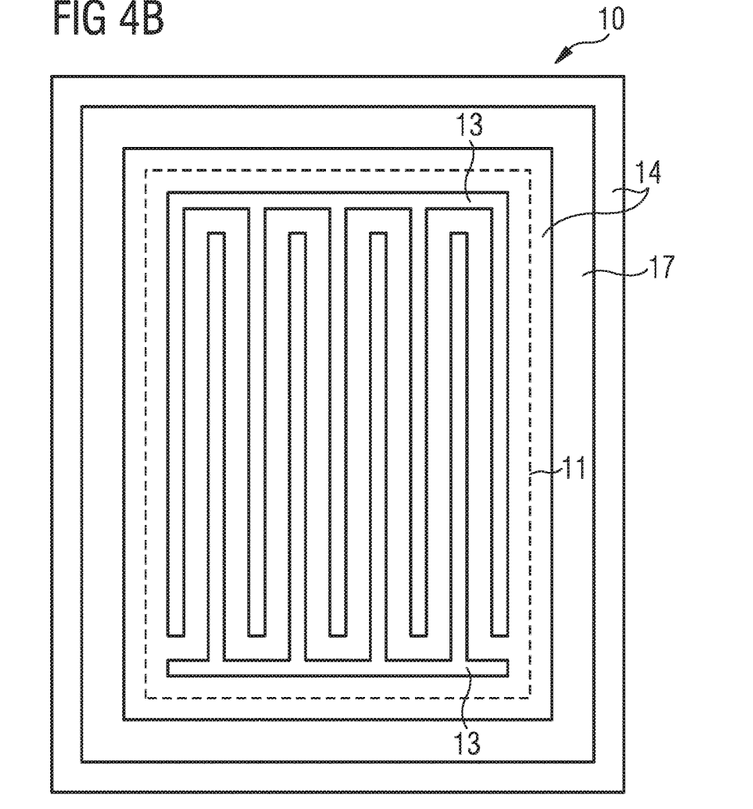

FIG. 4B shows a top view of the exemplary embodiment of the sensor semiconductor device 10 of FIG. 4A. The trench 17 surrounds the transducer 11 at all lateral sides.

Figure 5:
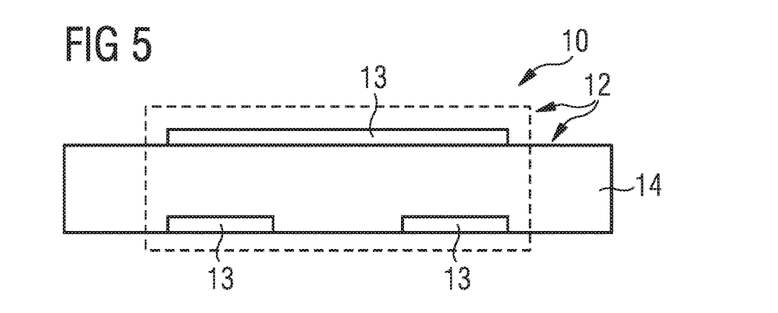
FIG. 5 shows a cutaway view of another exemplary embodiment of the sensor semiconductor device.

FIG. 5 shows a cutaway view of a further exemplary embodiment of the sensor semiconductor device 10. The capacitor 12 is a parallel plate capacitor. In difference to the embodiment shown in FIG. 1A the capacitor 12 consists of two capacitors in series and comprises in total three electrodes 13. Two electrodes 13 are arranged next to each other in a plane which is parallel to the main plane of extension of the polymer 14. The third electrode 13 is arranged above the two other electrodes 13 in vertical direction z. The two electrodes 13 arranged next to each other form the bottom electrodes of the two capacitors 12 connected in series. These capacitors 12 share the third top electrode 13.

Figure 6A:
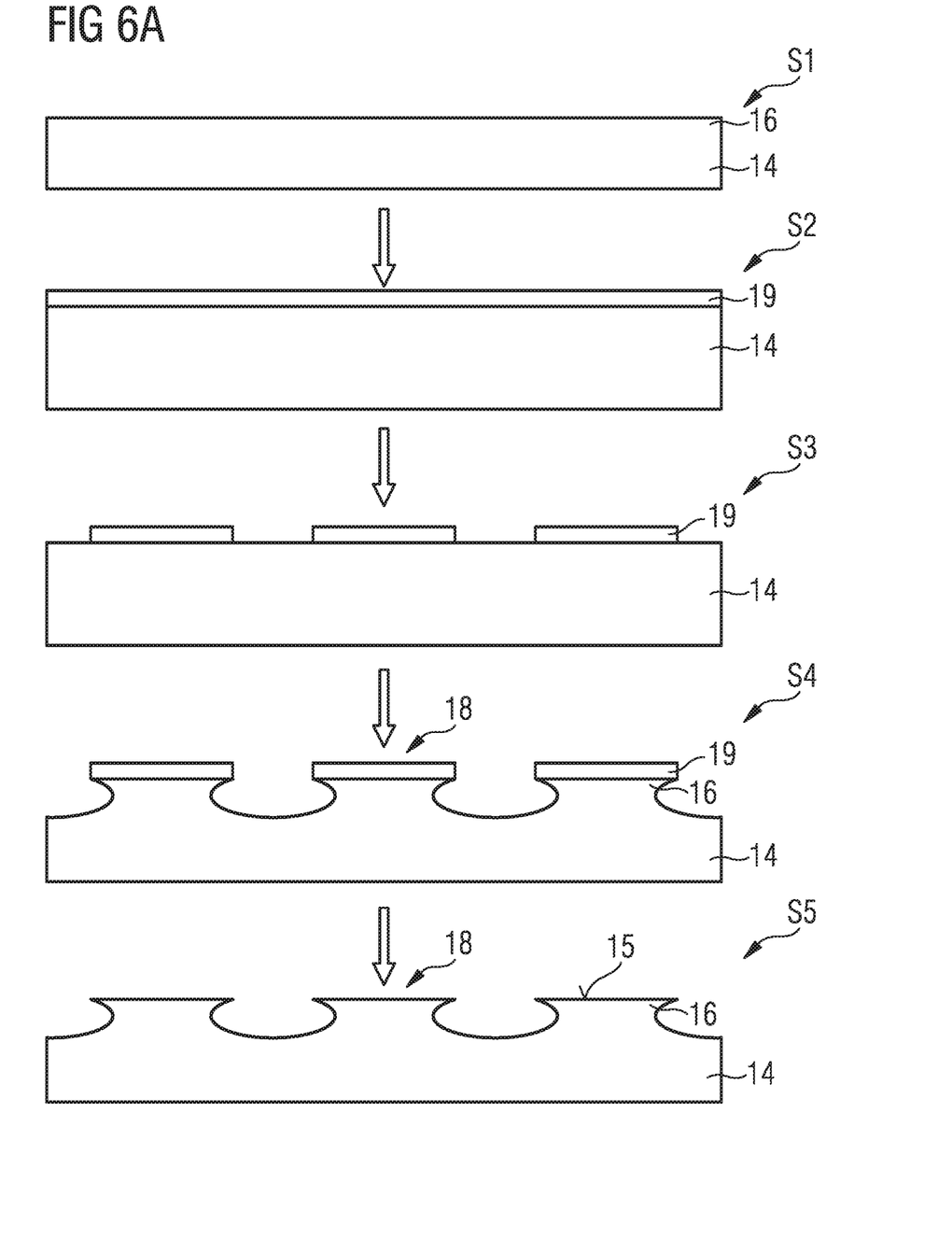

With FIG. 6A a method for forming an exemplary embodiment of the sensor semiconductor device 10 is described. In a first step S1 the polymer 14 is provided. The polymer 14 is arranged between and above the two electrodes 13 of the capacitor 12. The polymer 14 comprises a top layer 16 which is structured in the following steps.

In a second step S2 a masking layer 19 is deposited on top of the polymer 14. The masking layer 19 can be a photoresist layer or a hard mask layer which comprises for example silicon oxide, a nitride or a metal.

In the third step S3 the masking layer 19 is patterned by lithographic methods such that the masking layer 19 is removed from the polymer 14 in places. In this embodiment a regular pattern in the masking layer 19 is formed on top of the polymer 14.

In the fourth step S4 the top layer 16 of the polymer 14 is etched by wet chemical etching or by reactive ion etching through the masking layer 19. This means, the top layer 16 is only etched in the areas where the masking layer 19 is removed from the top layer 16. In this way, structures 18 are formed in the top layer 16. The lateral size of the structures 18 is at least 1 nm and at most 100 µm. However, the lateral size of the structures 18 is limited by the lithographic methods. The top layer 16 is laterally etched such that the angle between the top surface 15 and the structures 18 at the top surface 15 is less than 90°. In this way, the top surface 15 is made superhydrophobic. The depth of the etching and therefore the vertical height of the structures 18 can be tuned by the duration of the etching process. The height of the structures 18 in vertical direction z can be at least 1 nm and at most 1 µm.

In the fifth step S5 the masking layer 19 is removed. Regularly arranged structures 18 are formed within the top layer 16 of the polymer 14 such that the top surface 15 is superhydrophobic.

Alternatively, in the fourth step S4 the top layer 16 is laterally etched such that the masking layer 19 creates an overhang (not shown in FIG. 6A). In this case the fifth step S5 should be omitted.

Figure 6B:
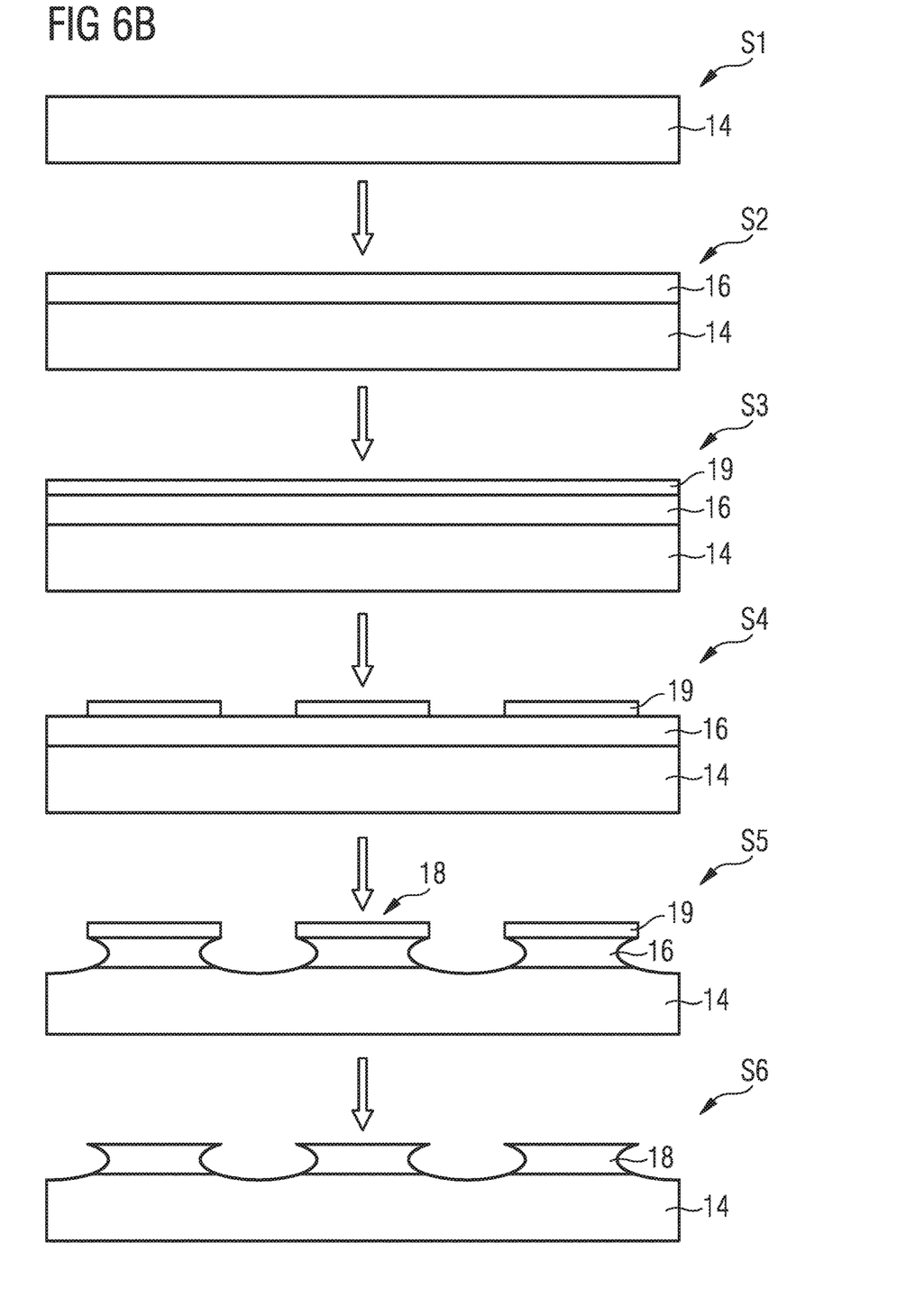
In FIG. 6B another method for forming an exemplary embodiment of the sensor semiconductor device is shown.

In FIG. 6B another method for forming an exemplary embodiment of the sensor semiconductor device 10 is shown. In a first step S1 the polymer 14 is provided. The polymer 14 is arranged between and above the two electrodes 13 of the capacitor 12.

In a second step S2 an additional top layer 16 is deposited on top of the polymer 14. It can be advantageous to deposit an additional top layer 16 which is structured if the top layer 16 comprises a material which can be more easily structured than the polymer 14.

In a third step S3 a masking layer 19 is deposited on top of the top layer 16.

In a fourth step S4 the masking layer 19 is patterned by lithographic methods such that the masking layer 19 is removed from the top layer 16 in places. A regular pattern in the masking layer 19 is formed on top of the top layer 16.

In a fifth step S5 the top layer 16 is etched by wet chemical etching or by reactive ion etching through the patterned masking layer 19. Thus, structures 18 are formed in the top layer 16. The top layer 16 is laterally etched such that the angle between the top surface 15 and the structures 18 at the top surface 15 is less than 90°. In this way, the top surface 15 is made superhydrophobic. In this case the depth of the etching can also be tuned by the thickness of the top layer 16.

In a sixth step S6 the masking layer 19 is removed. Regularly arranged structures 18 are formed within the top layer 16 such that the top surface 15 is superhydrophobic.

Figure 7A:
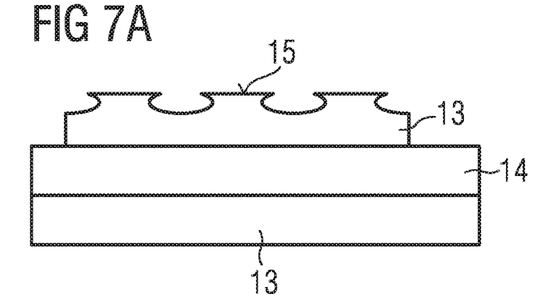
In FIGS. 7A, 7B, 7C and 7D further exemplary embodiments of the sensor semiconductor device with a structured top surface are shown.

In FIG. 7A a cutaway view of a further exemplary embodiment of the sensor semiconductor device 10 with a structured top surface 15 is shown. The capacitor 12 is a parallel plate capacitor. The surface of the upper electrode 13 is structured with a regular pattern such that the top surface 15 of the transducer 11 is superhydrophobic.

Figure 7B:
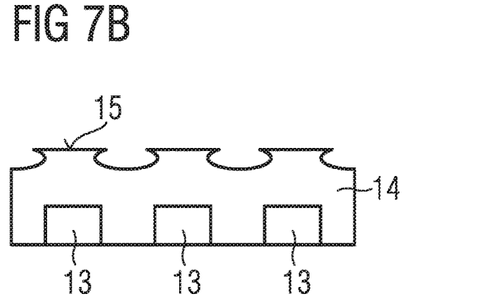

In FIG. 7B a cutaway view of a further exemplary embodiment of the sensor semiconductor device 10 with a structured top surface 15 is shown. The capacitor 12 is a fringe capacitor. The polymer 14 is arranged between and above the two electrodes 13 of the capacitor 12. The surface of the polymer 14 is structured with a regular pattern such that the top surface 15 of the transducer 11 is superhydrophobic.

Figure 7C:
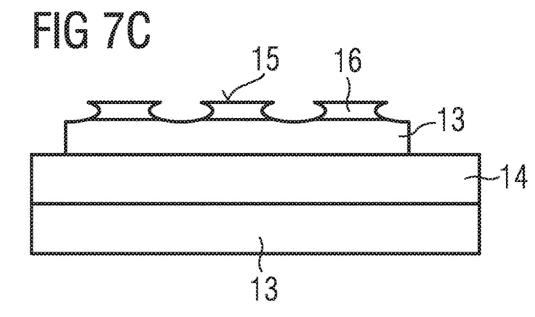

In FIG. 7C a cutaway view of a further exemplary embodiment of the sensor semiconductor device 10 with a structured top surface 15 is shown. The capacitor 12 is a parallel plate capacitor. On top of the upper electrode 13 an additional top layer 16 is arranged. The top layer 16 is structured with a regular pattern such that the top surface 15 of the transducer 11 is superhydrophobic.

Figure 7D:
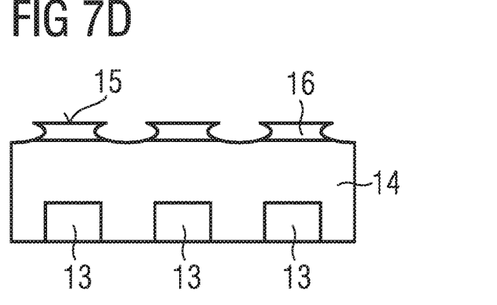

In FIG. 7D a cutaway view of a further exemplary embodiment of the sensor semiconductor device 10 with a structured top surface 15 is shown. The capacitor 12 is a fringe capacitor. On top of the polymer 14 an additional top layer 16 is arranged. The top layer 16 is structured with a regular pattern such that the top surface 15 of the transducer 11 is superhydrophobic.

Figure 8A:
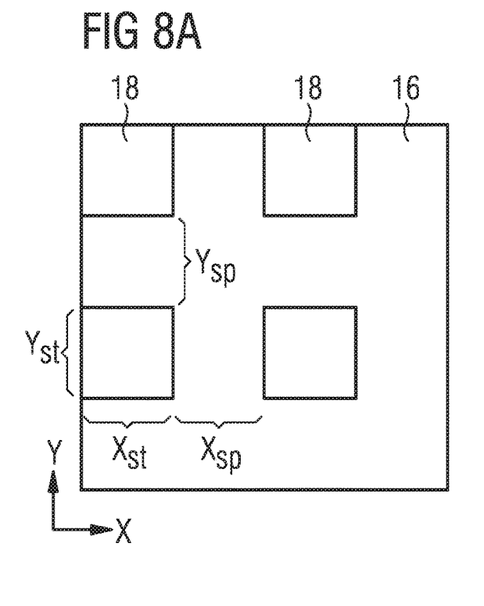
In FIGS. 8A and 8B a top view and a cutaway view on a structured top surface of the sensor semiconductor device are shown.

In FIG. 8A a top view on a structured top surface 15 of a sensor semiconductor device 10 is shown. The square-shaped structures 18 are arranged on top of the top layer 16 of the transducer 11. This means the top layer 16 can be an electrode 13, the polymer 14 or an additional top layer 16. The square-shaped structures 18 are formed on or within the top layer 16 and are arranged in a regular pattern.

If water droplets condense on the structured top surface 15 the contact angle $\theta_W$ of the water droplets is given by:

$$\cos\theta_W = r\cos\theta,$$

where $\theta$ is the contact angle on a flat, not structured surface, $\theta_W$ is the contact angle on a structured surface and r is the ratio between the real surface area $A_r$ and the projected surface area $A_p$. The contact angle $\theta_W$ is a measure for the hydrophobicity of a surface.

The real surface area $A_r$ is given by:

$$A_r = (x_{st}+x_{sp})*(y_{st}+y_{sp})+2*x_{st}*z_{st}+2*y_{st}*z_{st},$$

where $x_{st}$ gives the size of one structure 18 in x-direction, $y_{st}$ gives the size of one structure 18 in y-direction and $z_{st}$ gives the size of one structure 18 in z-direction. $x_{sp}$ gives the distance between two neighboring structures 18 in x-direction and $y_{sp}$ gives the distance between two neighboring structures 18 in y-direction.

The projected surface area $A_p$ is given by:

$$A_p = (x_{st}+x_{sp})*(y_{st}+y_{sp}).$$

Therefore, structures 18 that are large in x- and y-direction are giving low r-values for a constant z-value and are less effective in increasing the contact angle $\theta_W$ of water droplets. Thus, the lateral size of the structures 18 is at least 1 nm and at most 100 µm, whereas the size of the structures 18 in vertical direction z can be at least 1 nm and at most 1 µm.

Figure 8B:
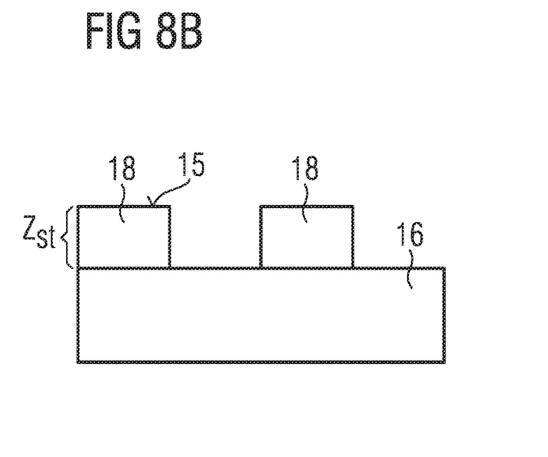

In FIG. 8B a cutaway view of a structured top surface 15 of the sensor semiconductor device 10 is shown. The square-shaped structures 18 are arranged on top of or in the top layer 16 of the transducer 11.

Figure 9:
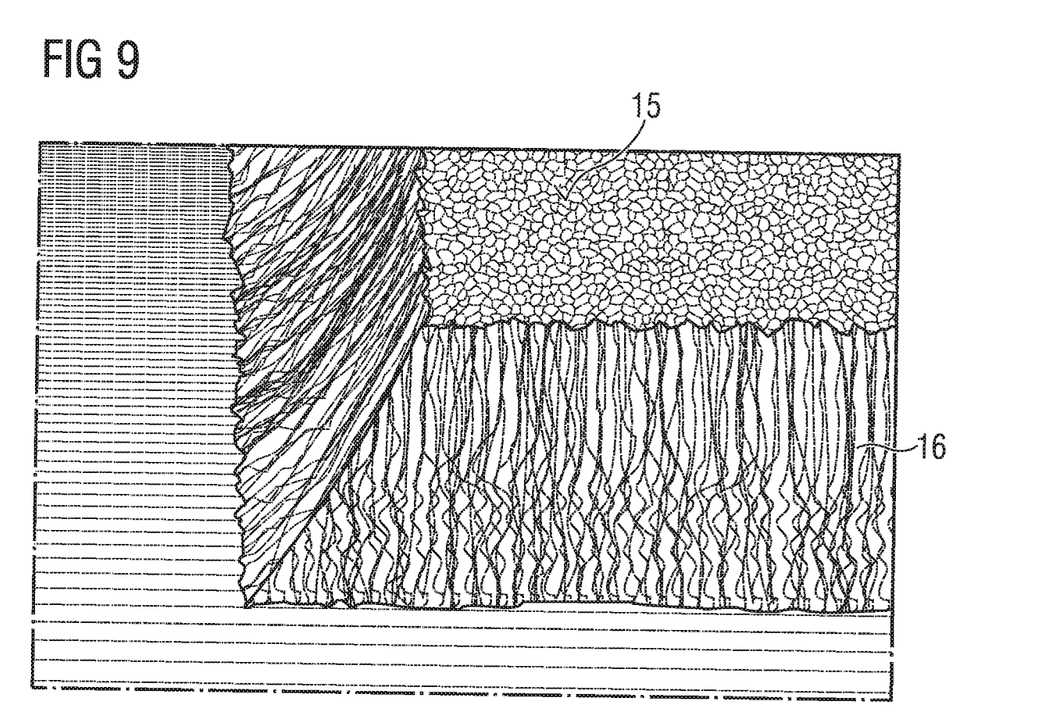
In FIG. 9 a randomly structured top surface of a sensor semiconductor device is shown.

In FIG. 9 a randomly structured top surface 15 of a sensor semiconductor device 10 is shown. The picture is obtained by scanning electron microscopy. It is shown that a top layer 16 is structured by reactive ion etching such that the top surface 15 of the transducer 11 is structured in a random pattern. The top surface 15 is roughened by exposure to a plasma of $N_2$, $O_2$ and $CF_4$.

The invention claimed is:

1. A sensor semiconductor device comprising:
a transducer comprising:
a capacitor with at least two electrodes,
a polymer arranged between the at least two electrodes of the capacitor, and
a top layer of the transducer with a top surface,
wherein the polymer is able to absorb water,
wherein the top surface is arranged such that it is exposed to an environment of the sensor semiconductor device,
wherein at least a part of the top surface is superhydrophobic as a result of structures extending into the top layer,
wherein a size of the structures is at least 1 µm and at most 100 µm in lateral directions which are parallel to a main plane of extension of the transducer,
wherein an angle between the top surface and the structures at the top surface is less than 90°,
wherein the structures have an undercut as a result of the angle of less than 90°, and
wherein the sensor semiconductor device is capable of measuring humidity of the environment of the sensor semiconductor device.

2. The sensor semiconductor device according to claim 1, wherein the capacitor is a plate capacitor.

3. The sensor semiconductor device according to claim 1, wherein the capacitor is a fringe capacitor.

4. The sensor semiconductor device according to claim 1, wherein a trench is arranged around the transducer, the trench configured to provide drainage of a liquid from the top surface.

5. The sensor semiconductor device according to claim 1, wherein structures are patterned within the top surface by photolithography, and wherein the size of the structures is at least 1 nm and at most 1 µm in vertical direction, which is perpendicular to the main plane of extension of the transducer.

6. The sensor semiconductor device according to claim 1, wherein the top surface is a surface of the polymer.

7. A method for producing a sensor semiconductor device, the method comprising:
forming a transducer comprising a capacitor with at least two electrodes;
arranging a polymer between the at least two electrodes of the capacitor; and
structuring a top layer of the transducer such that a top surface of the top layer is at least partially superhydrophobic as a result of structures extending into the top layer,
wherein the polymer is able to absorb water,
wherein the top surface is arranged such that it is exposed to an environment of the sensor semiconductor device,
wherein a size of the structures is at least 1 nm and at most 100 µm in lateral directions which are parallel to a main plane of extension of the transducer,
wherein an angle between the top surface and the structures at the top surface is less than 90°,
wherein the structures have an undercut as a result of the angle of less than 90°, and
wherein the sensor semiconductor device is capable of measuring humidity of the environment of the sensor semiconductor device.

8. The method according to claim 7, wherein the top layer is comprised by the polymer.

9. The method according to claim 7, wherein an electrode of the capacitor comprises the top layer.

10. The method according to claim 7, wherein the top layer is comprised neither by the polymer nor by an electrode of the capacitor.

11. The method according to claim 7, wherein the capacitor is a plate capacitor.

12. The method according to claim 7, wherein the capacitor is a fringe capacitor.

13. The method according to claim 7, wherein a trench is arranged around the transducer, the trench providing drainage of a liquid from the top surface.

14. The method according to claim 7, wherein structuring the top layer comprises patterning.

15. The method according to claim 7, wherein the top surface is a surface of the polymer.

16. The method according to claim 7, wherein structuring the top layer comprises roughening.

17. The method according to claim 7, wherein structuring the top layer comprises providing a chemical treatment.

18. The method according to claim 7, wherein structuring the top layer comprises etching.

19. The method according to claim 7, wherein structuring the top layer comprises providing ultra violet light exposure.

20. The method according to claim 7, wherein structuring the top layer comprises growing nanostructured metal layers.

21. The method according to claim 7, wherein, prior to structuring, the top layer is a homogenous non-fiber layer.

\* \* \* \* \*

UNITED STATES PATENT AND TRADEMARK OFFICE
CERTIFICATE OF CORRECTION

PATENT NO. : 11,262,325 B2
APPLICATION NO. : 16/611805
DATED : March 1, 2022
INVENTOR(S) : Micha In't Zandt et al.

It is certified that error appears in the above-identified patent and that said Letters Patent is hereby corrected as shown below:

In the Claims

Claim 1, Column 11, Line 18, delete "1 μm" and insert --1 nm--.

Signed and Sealed this
Third Day of September, 2024

Katherine Kelly Vidal
*Director of the United States Patent and Trademark Office*